Figures 1, 2:
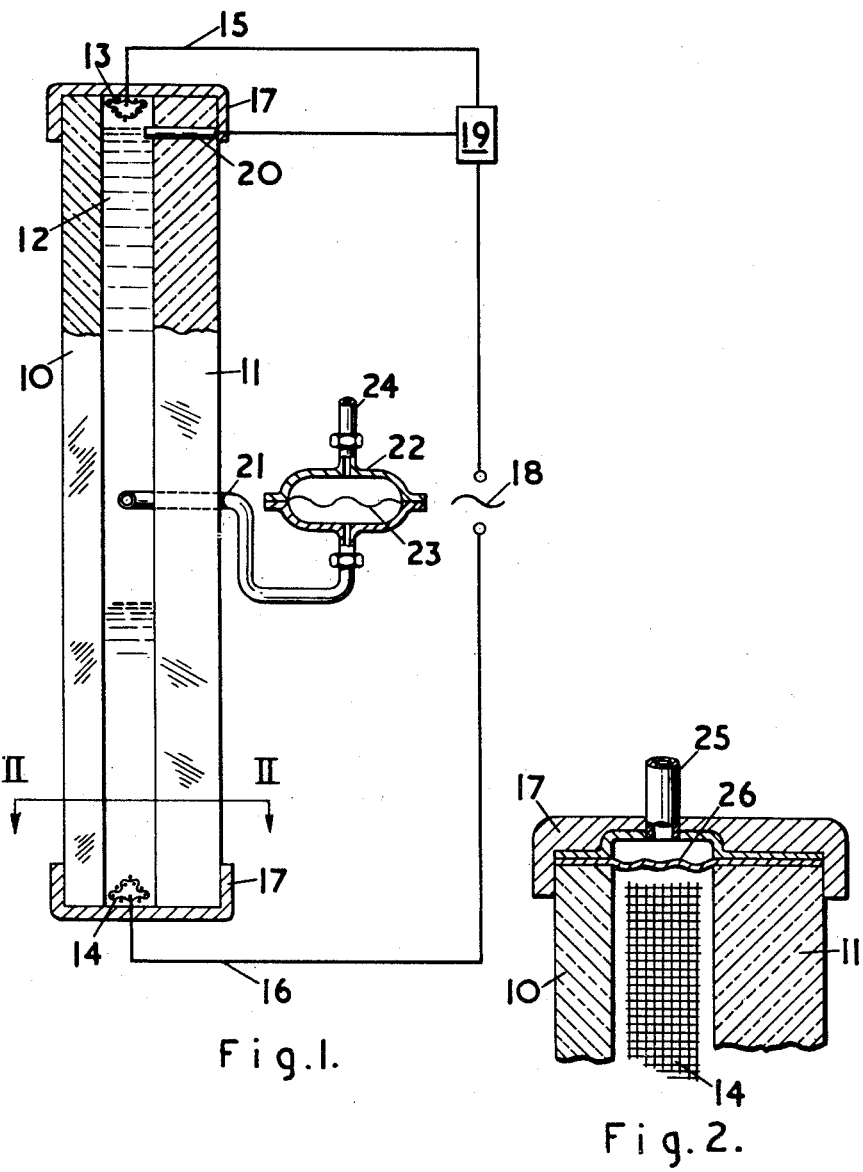

Feb. 27, 1951    W. G. GLENDINNING ET AL    2,543,363
ELECTRICALLY HEATED PANEL

Filed Aug. 1, 1949

INVENTORS
WILLIAM GERALD GLENDINNING
GEORGE ALLAN EARWICKER

*Cushman, Darby & Cushman*
ATTORNEYS

Patented Feb. 27, 1951

2,543,363

UNITED STATES PATENT OFFICE 2,543,363

ELECTRICALLY HEATED PANEL

William G. Glendinning, Seale, Farnham, and George A. Earwicker, Farnborough, England Application August 1, 1949, Serial No. 107,996
In Great Britain August 9, 1948

11 Claims. (Cl. 219—19)

This invention relates to electrically heated panels and is more especially concerned with the provision of transparent panels, such as windows and windscreens, which may be heated for the purpose of de-icing and anti-misting.

A transparent panel in accordance with the invention is heated by the passage of alternating current electricity through a transparent electrolyte positioned between two surfaces which are substantially non-conductive of electricity. The term "alternating current" is used in a broad sense to indicate current of which the polarity is periodically reversed and with the object of excluding only direct current; there is no intention of limitation to the use of alternating current having a sinusoidal wave form.

Whilst it is theoretically possible for the electrolytic conductor employed to be in the solid state, for example in the form of a hydrophilic gel, it is preferred to employ an electrolyte in the liquid phase, for example an aqueous solution of a suitable salt. Where freezing of an aqueous solution is to be guarded against, as in the case of transparent panels for aircraft, it may be necessary to add a freezing point depresser, such as a polyhydric alcohol; since, however, the addition of ethylene glycol has been found to cause excessive increase of resistance with decreasing temperature, it is preferred to avoid the use of such additions whenever possible.

Specific examples of aircraft windscreens in accordance with the invention are illustrated by the accompanying drawings in which:

Figure 1 represents a vertical section through a windscreen, with essential electrical circuitry added and Figure 2 represents, to a larger scale, a scrap view of a windscreen modified as to a detail and considered in section on a line corresponding to the line II—II of Figure 1.

The windscreen shown by Figure 1 comprises a glass "sandwich" of normal construction but having, at the front, a sheet (which term includes "Laminate") 10 of glass spaced from the adjacent sheet 11 to provide a space which is filled with an electrolyte 12; the electrolyte is compatible with the adhesive employed in the construction of the sandwich and is also of suitable optical properties, that is to say, is transparent and of refractive index approximating to that of the glass. Electrodes 13 and 14 are positioned, outside the field of vision, at top and bottom respectively of the space between the glass sheets 10 and 11 and are connected to the external electric circuit by leads 15 and 16 passing through sealing material 17 provided at the edges of the screen. The electrical circuit includes a source 18 of alternating current electricity and a variable inductance 19 which is controlled, to limit the temperature of the electrolyte, by a thermo-sensitive device 20. In order to safeguard the glass, means (not shown) may be provided to control the rate of heating during warming up; alternatively, the glass may be protected against the effects of too rapid initial heating by suitable limitation of the maximum load on the electrodes.

The requisite thickness of the layer of electrolyte will depend primarily upon the voltage of the available supply, although a very thin layer may call for especial precautions to combat unevenness of heating due to distortion of the forward sheet of glass under the effect of air pressure. Distortion of the forward sheet may be prevented or reduced by the use of suitable spacing members but one of the arrangements illustrated is preferred. In the arrangement shown by Figure 1 the electrolyte-containing space communicates, by way of a pipe 21, with a chamber in which is a flexible diaphragm 23 situated substantially on the level of the centre of the windscreen. The diaphragm serves not only to accommodate thermal expansion of the electrolyte but also to transmit to it Pitot pressure, which is applied to the chamber 22 by way of a pipe 24. In the alternative arrangement shown by Figure 2, Pitot pressure is applied by way of a pipe 25 to a flexible diaphragm 26, which, with a similar diaphragm provided at the opposite lateral edge of the screen serves to accommodate thermal expansion of the electrolyte. Any diaphragms employed are, of course, made of a material which is not attacked by the electrolyte.

The minimum thickness of the front sheet 10 is dependent upon the working temperature of the electrolyte and the minimum external temperature at which it is desired the device shall be operative; if the glass were too thin, the external conditions could be such that the power (heat) output could not exceed the heat loss to atmosphere.

The arrangements illustrated by the drawings are intended to guard against icing up of the windscreens, and the latter are therefore formed with a thinner glass sheet on the outer side. If anti-misting were the main requirement, the thickness of the inner wall of the screen would be made appropriately small. Where both de-icing and anti-misting are important and military or other requirements call for the presence of a relatively thick sheet or transparent material equivalent to that indicated at 11 in the drawing, it may be desirable to provide layers of electrolyte, with associated electrodes, adjacent both outer and inner faces of the screen and on opposite sides of the thick sheet.

Where diaphragms or their equivalents are not required in connection with the balancing of external pressure, it may be more convenient to accommodate thermal expansion of the electrolyte by a space above the upper electrode 13, the space being filled, if necessary, with inert gas.

An electrolyte which has been found satisfactory is a 28% (weight for weight) aqueous solution of lithium chloride, which can be used without the addition of a freezing-point depresser, in conditions involving temperatures down to —60° C. Magnesium chloride, in aqueous solution, is another electrolyte which could be employed. Care should be taken to ensure that the electrolyte does not contain dissolved gas likely, under working conditions, to come out of solution and form bubbles.

An electrode which has been found suitable for use with current of 50 cycles or more is silver sponge on silver gauze. Silver foil and silver gauze are other suitable electrode material; in fact, any inert conducting material will serve, providing it has sufficient mechanical strength and is given sufficient surface area. With some materials, the surface area of the electrode will require to be somewhat large if gassing is to be avoided at high current densities; the greater the frequency of the current, the smaller can be the surface area of the electrodes.

The ability to use alternating current of relatively low frequency may sometimes be desirable, not only to reduce radio interference, but also to make possible the use of a simple battery-commutator system in cases in which suitable alternating current from a generator is not available; if current of less than 50 cycles is to be used, the avoidance of gassing will probably necessitate the use of an electrode comprising a metal in intimate contact with an insoluble salt of that metal, such as a silver/silver chloride electrode. Where possible, it would be preferable to have in the electrode the same metal as is in the electrolyte but this is not possible, of course, in the case of lithium.

The positioning of the electrodes at the upper and lower edges of the screen as illustrated (and as preferred) promotes even distribution of heat through the effect of convection. To enlist the aid of convection in the same way with laterally arranged electrodes necessitates the accommodation of the electrodes in enlarged cells, The electrolyte contained in which is always cooler than the rest during heating up.

We claim:

1. A transparent panel fitted in a craft or vehicle and comprising inner and outer transparent walls, a transparent electrolyte retained in a space bounded by such walls, electrodes whereby alternating current electricity may be passed through the electrolyte and means for subjecting the electrolyte to substantially the same pressure as that to which the outer surface of the outer transparent wall is subject.

2. A transparent panel as claimed is claim 1 in which provision is made for subjecting to Pitot pressure one or more flexible diaphragms bounding the space within which the electrolyte is retained.

3. A transparent panel adapted for electrical heating comprising a pair of transparent, electrically insulating walls bounding a space adapted to receive and retain electrolyte, and a pair of electrodes whereby electric current may be passed through electrolyte contained within the space bounded by said walls.

4. A transparent panel as claimed in claim 3 in which the electrodes are situated at opposite edges of the space bounded by said walls.

5. A transparent panel affording a field of vision through a pair of transparent, electrically insulating walls and comprising a transparent electrolyte retained within a space bounded by said walls and electrodes positioned clear of the field of vision, whereby electric current may be passed through the electrolyte and across the field of vision.

6. An electrically heated transparent panel comprising a pair of transparent, electrically insulating walls, a transparent electrolyte confined between said walls, a pair of spaced electrodes immersed within said electrolyte and a source of alternating current electricity connected to said electrodes.

7. An electrically heated transparent panel as claimed in claim 6 in which the said electrolyte is lithium chloride.

8. An electrically heated transparent panel as claimed in claim 6 in which the said electrodes comprise silver sponge.

9. An electrically heated transparent panel comprising a pair of transparent, electrically insulating sheets arranged with their surfaces substantially vertical and bounding a space between them, a transparent electrolyte confined within the space between said transparent sheets, electrodes immersed within said electrolyte and situated at top and bottom respectively of the space between said transparent sheets and a source of alternating current electricity connected to said electrodes.

10. A transparent panel adapted for electrical heating comprising a pair of transparent, electrically insulating sheets spaced apart to define a space between them, a transparent electrolyte filling the space between said sheets, a flexible diaphragm sealing said electrolyte within the said space, and electrodes immersed in said electrolyte and situated at opposite edges of the space between said sheets.

11. A transparent panel comprising two spaced electrically non-conducting transparent sheets, edge walls cooperating with the sheets for retaining in the zone between the sheets a body of transparent electrolyte, and spaced electrodes within the zone and so positioned to be immersed when the zone is supplied with electrolyte, the electrodes being adapted for connection to a source of alternating current whereby the sheets may be continuously heated by passage of electric current through the electrolyte.

WILLIAM G. GLENDINNING.
GEORGE A. EARWICKER.

REFERENCES CITED

The following references are of record in the file of this patent:

UNITED STATES PATENTS

| Number | Name | Date |
| --- | --- | --- |
| 1,326,443 | Cutting | Dec. 30, 1919 |
| 1,350,631 | Xardell | Aug. 24, 1920 |
| 2,429,420 | McMaster | Oct. 21, 1947 |

FOREIGN PATENTS

| Number | Country | Date |
| --- | --- | --- |
| 382,173 | Great Britain | Oct. 20, 1932 |